(12) United States Patent
Siemens et al.

(10) Patent No.: US 11,668,370 B2
(45) Date of Patent: Jun. 6, 2023

(54) TORSIONAL VIBRATION DAMPING ASSEMBLY

(71) Applicant: ZF Friedrichshafen AG, Friedrichshafen (DE)

(72) Inventors: Kyrill Siemens, Würzburg (DE); Jörg Bender, Würzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 149 days.

(21) Appl. No.: 17/428,043

(22) PCT Filed: Feb. 11, 2020

(86) PCT No.: PCT/EP2020/053459
§ 371 (c)(1),
(2) Date: Aug. 3, 2021

(87) PCT Pub. No.: WO2020/165163
PCT Pub. Date: Aug. 20, 2020

(65) Prior Publication Data
US 2022/0107000 A1    Apr. 7, 2022

(30) Foreign Application Priority Data
Feb. 13, 2019    (DE) .......................... 102019201875.0

(51) Int. Cl.
*F16F 15/14*    (2006.01)
(52) U.S. Cl.
CPC ........ *F16F 15/145* (2013.01); *F16F 2222/08* (2013.01); *F16F 2224/025* (2013.01);
(Continued)
(58) Field of Classification Search
CPC ........... F16F 2228/001; F16F 2228/007; F16F 2236/08
See application file for complete search history.

(56) References Cited
U.S. PATENT DOCUMENTS
2018/0045268 A1* 2/2018 Siemens ............... F16F 15/145

FOREIGN PATENT DOCUMENTS
DE     19911560 A1    9/2000
DE     102009042818 A1    5/2010
(Continued)

OTHER PUBLICATIONS
International Search Report and Written Opinion for PCT/EP2020/053459 dated Jun. 9, 2020 (12 pages; with English translation).

Primary Examiner — Vicky A Johnson
(74) Attorney, Agent, or Firm — Kristin L. Murphy

(57) ABSTRACT

The disclosure relates to a torsional vibration damping assembly comprising a deflection mass carder capable of rotation about a rotational axis and deflection masses mounted following one another in a circumferential direction on the deflection mass carrier and deflectable from a basic relative position, wherein the radial position of the deflection masses with respect to the rotational axis changes on deflection from the basic relative position, with each deflection mass being mounted deflectably in both circumferential directions from the basic relative position by coupling formations on the deflection mass carrier, with a resiliently deformable stop formation being provided and assigned to each deflection mass to haft a deflection movement of the deflection mass once a stop deflection has been reached, with the resiliently deformable stop formation comprising a resilient stop material which is fixedly mounted with respect to the deflection mass carder, with the following ratio R being applicable in the assignment to each deflection mass: R=VE/E wherein VE is an effective stop material volume assigned to a deflection mass on reaching the stop deflection by deformation of the resilient stop material and E is an impact metric relative to the kinetic energy of a deflection mass on reaching the stop deflection,
(Continued)

and wherein the following applies for the ratio R: $0.15 \times 10^{-3}$ m2/kg $\leq$ R $\leq$ $0.6 \times 10^{-3}$ m2/kg.

15 Claims, 3 Drawing Sheets

(52) U.S. Cl.
CPC ... *F16F 2228/001* (2013.01); *F16F 2228/007* (2013.01); *F16F 2230/007* (2013.01); *F16F 2232/02* (2013.01); *F16F 2236/08* (2013.01)

(56) References Cited

FOREIGN PATENT DOCUMENTS

| | | |
|---|---|---|
| DE | 102011086436 A1 | 6/2012 |
| DE | 102013217090 A1 | 3/2015 |
| DE | 102015222822 A1 | 5/2017 |
| EP | 2282078 A2 | 2/2011 |

\* cited by examiner

TORSIONAL VIBRATION DAMPING ASSEMBLY

CROSS-REFERENCE TO RELATED APPLICATIONS

This application is a national stage of International Application No. PCT/EP2020/053459, filed Feb. 11, 2020, the disclosure of which is incorporated herein by reference in its entirety, and which claimed priority to German Patent Application No. 102019201875.0, filed Feb. 13, 2019, the disclosure of which is incorporated herein by reference in its entirety.

TECHNICAL FIELD

The present disclosure relates to a rotary vibration damping assembly, in particular a rotational-speed-adaptive absorber, comprising a deflection mass carrier, which is rotatable about an axis of rotation, and a multiplicity of deflection masses which are mounted, following one another in a circumferential direction, on the deflection mass carrier so as to be deflectable out of a basic relative position with respect thereto, wherein, during deflection out of the basic relative position, the radial position of the deflection masses with respect to the axis of rotation changes, wherein the deflection masses are mounted by coupling formations on the deflection mass carrier so as to be deflectable in both circumferential directions proceeding from the basic relative position, wherein, in association with at least one deflection mass, there is provided an elastically deformable stop formation for ending the deflection movement of the deflection mass after a stop deflection is reached, wherein the elastically deformable stop formation comprises elastic stop material which is mounted fixedly with respect to the deflection mass carrier.

BACKGROUND

In the case of rotary vibration damping assemblies, deflection masses are forced radially outward with respect to an axis of rotation, and thus into their basic relative position with respect to the deflection mass carrier, by centrifugal forces that act during rotational operation. In the event of periodic rotational non-uniformity, the deflection masses can, in a centrifugal potential, move radially inward proceeding from a basic relative position, wherein said deflection masses absorb potential energy. It is thus possible for a vibration of the deflection masses to be established which counteracts a stimulating vibration.

The configuration of the deflection masses, or of the deflection mass carrier that bears these, is such that, during normal rotational operation, that is to say in the case of deflection masses performing a vibration with respect to the deflection mass carrier, contact does not occur between the deflection masses and the elastically deformable stop formation which is associated with said deflection masses and which is provided on the deflection mass carrier. The elastically deformable stop formation however takes effect when, for example during shutdown of an internal combustion engine and in the case of decreasing rotational speed, a centrifugal force acting on the deflection masses and forcing these radially outward also decreases. It is also the case when, during the starting of an internal combustion engine under the action of a starter or starter/generator, a very intense rotational acceleration occurs which also acts on the deflection mass carrier, and which, upon the onset of ignition, may have torque shocks output by the internal combustion engine superposed thereon, that the elastically deformable stop formation can take effect in order to prevent hard impacts and thus also damage in the region of the deflection masses or on the deflection mass carrier and also impact noises.

What is needed a rotary vibration damping assembly which, whilst being of compact and reliable construction, ensures, even in the case of the maximum rotational accelerations to be expected during rotational operation, the effectiveness of a stop formation constructed with elastically deformable material, in the range of the elastic deformability thereof.

SUMMARY

According to the disclosure, a rotary vibration damping assembly is disclosed. More specifically, a rotational-speed-adaptive absorber, comprising a deflection mass carrier, which is rotatable about an axis of rotation, and a multiplicity of deflection masses which are mounted, following one another in a circumferential direction, on the deflection mass carrier so as to be deflectable out of a basic relative position with respect thereto is disclosed. During deflection out of a basic relative position, the radial position of the deflection masses with respect to the axis of rotation changes. The deflection masses are mounted by coupling formations on the deflection mass carrier so as to be deflectable in both circumferential directions proceeding from the basic relative position. In association with at least one, and in one exemplary arrangement, preferably each, deflection mass, there is provided an elastically deformable stop formation for ending the deflection movement of the deflection mass after a stop deflection is reached. The elastically deformable stop formation comprises elastic stop material which is mounted fixedly with respect to the deflection mass carrier. In association with at least one, and in one exemplary arrangement, preferably each, deflection mass, the following applies:

$$R = V_E/E$$

where $V_E$ is a stop material volume which, in association with a deflection mass, is effective when the stop deflection is reached as a result of deformation of the elastic stop material, and E is an impact variable related to the kinetic energy of a deflection mass when the stop deflection is reached, and wherein, for the ratio R, the following applies:

$$0.15 \times 10^{-3} \text{ m}^2/\text{kg} \leq R \leq 0.6 \times 10^{-3} \text{ m}^2/\text{kg}.$$

With such a configuration of a ratio between the impact variable, which represents the kinetic energy when the stop deflection is reached or is related to said kinetic energy, and the volume of the stop material that is available, or to be deformed, in the event of contact between a deflection mass and the stop material, it is ensured that, even under unfavorable kinetic conditions, that is to say in the event of impacting of a deflection mass at a very high or maximum expected speed, a sufficient volume of the stop material is available in order to, by deformation thereof, absorb the movement of the deflection mass without a hard impact.

Here, in accordance with the principles of the present disclosure, it may be provided that the following applies for the impact variable E:

$$E = M_{\text{eff}} \times 2 \times A_A$$

where $M_{\text{eff}}$ is an effective mass of a deflection mass and $A_A$ is the stop deflection of a deflection mass, with respect to the basic relative position of the deflection mass, in the event of contact between the deflection mass and the stop material. The impact variable is thus a variable derived from the momentum of a deflection mass, which variable takes into consideration both the mass, or the effective mass, of the deflection mass and the maximum travel which can be covered during a deflection movement of the deflection mass and over which the deflection mass can be accelerated with respect to the deflection mass carrier owing to the rotational acceleration acting in particular on the deflection mass carrier.

If the deflection mass moves in air, the effective mass of a deflection mass may be the mass of the deflection mass.

If the deflection mass moves in a medium of greater density, that is to say for example in an interior space of a hydrodynamic torque converter which is fully filled with oil, it may be the case that, taking into consideration the density of the medium surrounding the deflection mass, the following applies for the effective mass of a deflection mass:

$$M_{eff} = (\rho_A - \rho_U) \times V_A$$

where $\rho_A$ is the density of a construction material of the deflection mass, $\rho_U$ is the density of a medium surrounding the deflection mass, and $V_A$ is the volume of the deflection mass.

Furthermore, in particular taking into consideration the assumption, which is to be regarded merely as an approximation, that a center of mass of the deflection mass moves on a circular path, the following may apply for the stop deflection:

$$A_A = 2 \times r_B \times \pi \times W_2 / 360°$$

where $r_B$ is a path radius of a movement path of the center of mass of the deflection mass about a center of mass movement center, and $W_2$ is a deflection angle of the center of mass during movement of the deflection mass between the basic relative position of the deflection mass with respect to the deflection mass carrier and the relative position of the deflection mass with respect to the deflection mass carrier that exists in the event of contact between the deflection mass and the stop material.

In the case of the rotary vibration damper assembly constructed in accordance with the disclosure, it may furthermore be provided that each coupling formation comprises at least one guide track with a radially externally situated guide track apex in the deflection mass carrier, at least one guide track with a radially internally situated guide track apex in one of the deflection masses, and a in one exemplary arrangement, a roller-like coupling element which is movable along the at least one guide track in the deflection mass carrier and the at least one guide track in the deflection mass wherein. The deflection mass is positioned in the basic relative position, and the coupling element is positioned at the guide track apex of the at least one guide track in the deflection mass carrier and at the guide track apex of the at least one guide track in the deflection mass.

Furthermore, for a defined movement of the deflection mass, it is proposed that each deflection mass is coupled by the coupling formations associated therewith to the deflection mass carrier such that, during deflection out of the basic relative position, a deflection movement of the deflection mass is made up of a translational radial movement in a direction parallel to a radial direction with respect to the axis of rotation and a translational tangential movement in a direction orthogonal to a radial direction with respect to the axis of rotation.

In one exemplary arrangement, the stop material may be constructed with an elastomer material. Exemplary materials include, but are not limited to, AEM, FKM, HNBR or EPDM. Such elastomer material may, in one exemplary arrangement for use in a rotary vibration damping assembly according to the disclosure, have a Shore A hardness in the range from 0.8-0.95. In one exemplary arrangement, the elastomer material may have a Shore A hardness of approximately 0.9.

The disclosure furthermore relates to a drive system for a vehicle, comprising an internal combustion engine and a drivetrain which interacts in terms of drive with the internal combustion engine and which has at least one rotary vibration damping assembly in accordance with the disclosure.

BRIEF DESCRIPTION OF THE DRAWINGS

The present disclosure will be described in detail below with reference to the appended figures, in which.

DETAILED DESCRIPTION

Figure 1:
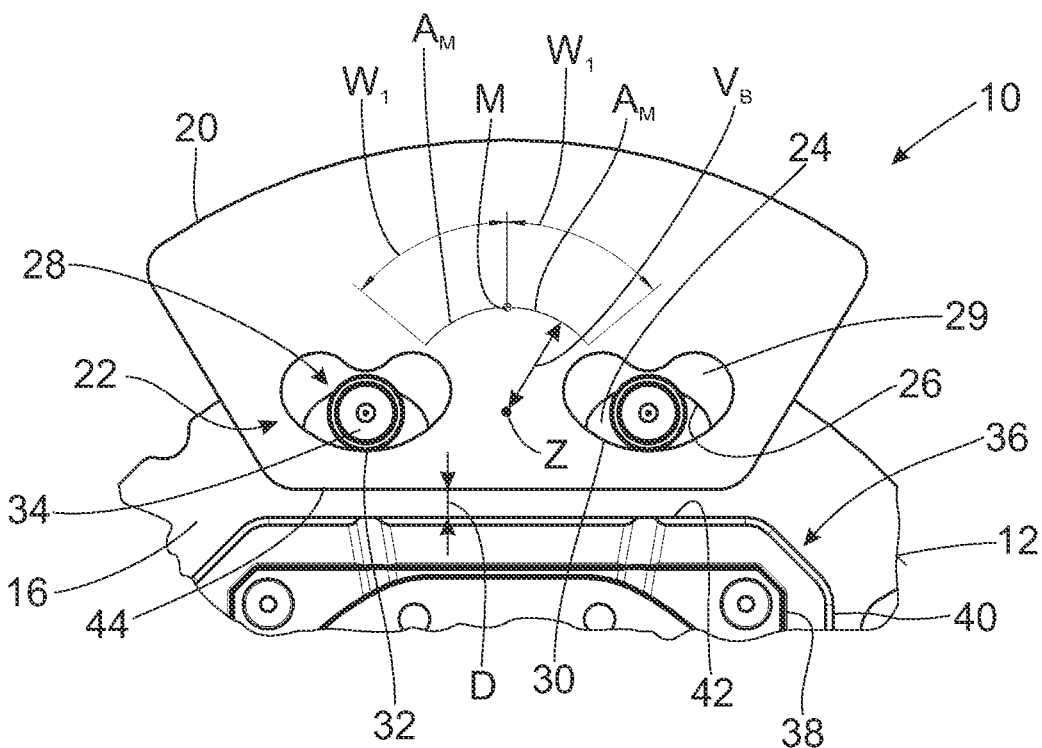
FIG. 1 shows an axial view of a rotary vibration damping assembly with a deflection mass positioned in a basic relative position.
Figure 2:
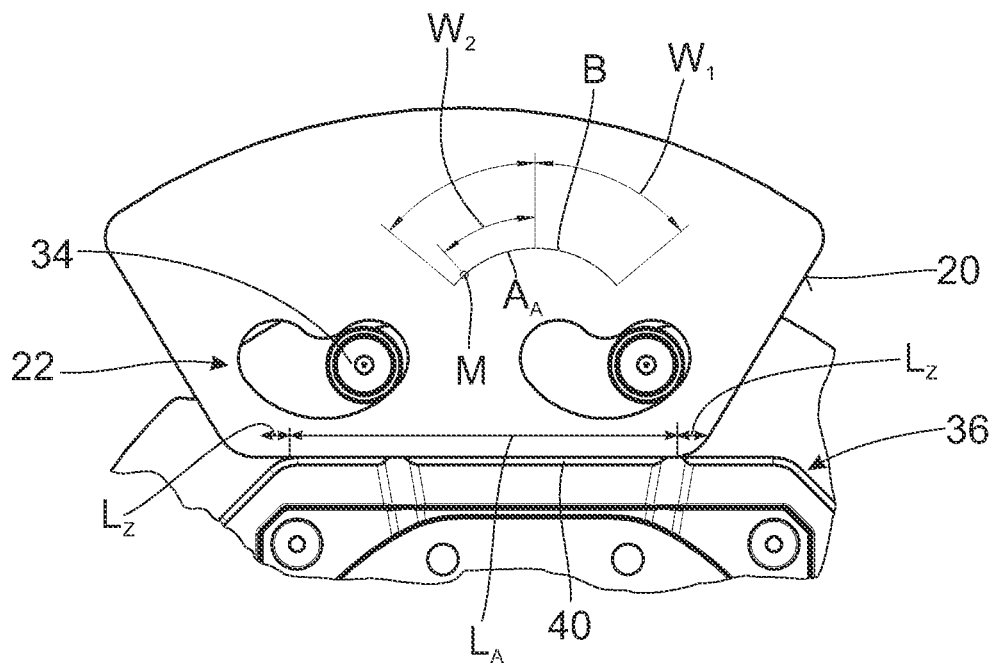
FIG. 2 shows a view corresponding to FIG. 1 with a deflected deflection mass.
Figure 3:
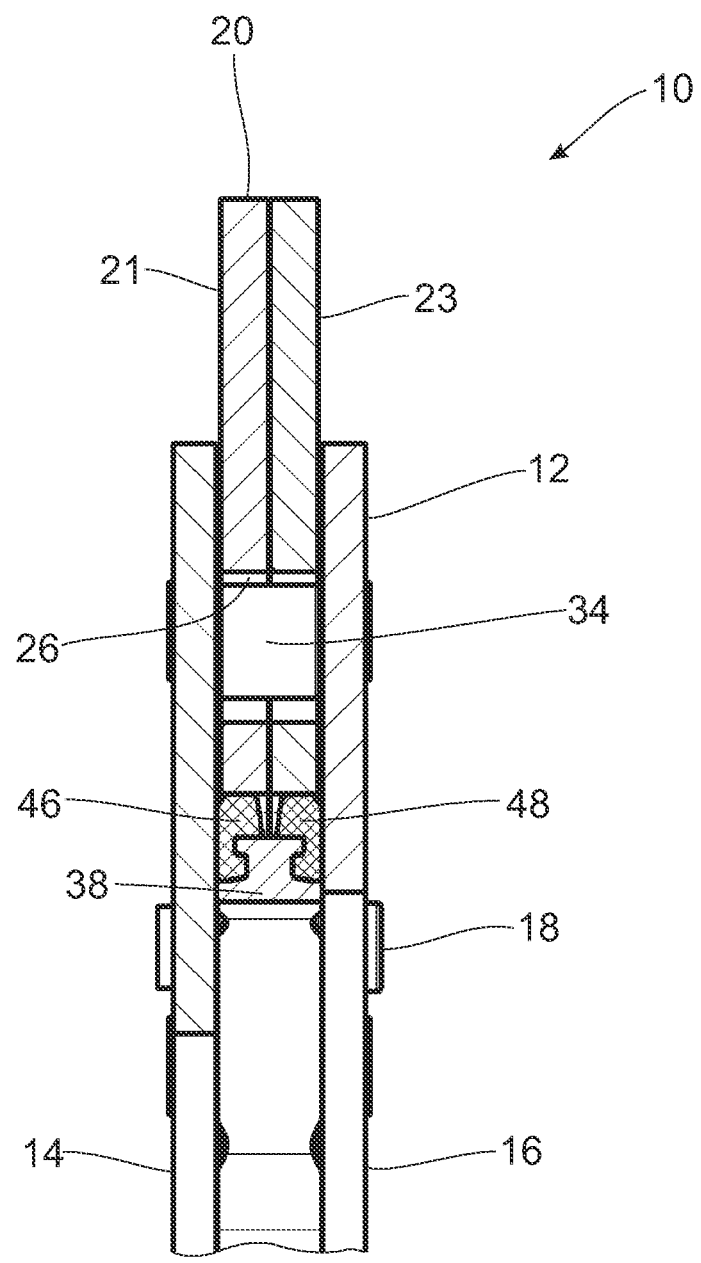
FIG. 3 shows a partial longitudinal sectional view of the vibration damping assembly with the deflected deflection mass.

In FIGS. 1-3, a rotary vibration damping assembly, which is referred to or acts as a rotational-speed-adaptive absorber, is denoted generally by 10. The rotary vibration damping assembly 10 comprises a deflection mass carrier 12 with two carrier disks 14, 16 which are arranged following one another in the direction of an axis of rotation A. The carrier disks 14, 16 are fixedly connected to one another with an axial spacing by a multiplicity of rivet bolts 18.

In one exemplary arrangement, the rotary vibration damping assembly 10 comprises four deflection masses 20 which are arranged following one another in a circumferential direction and of which one is illustrated in FIG. 1. In FIG. 1, carrier disk 14, which is situated in front of the deflection mass 20 in this illustration, is not shown. Each of the deflection masses 20 may comprise one or more disks 21, 23 which are positioned following one another axially and are possibly fixedly connected to one another. Each deflection mass 20 is coupled by two coupling formations, which are arranged with a circumferential spacing to one another and which are denoted generally by 22 and which, in one exemplary arrangement, are basically mutually identical or of mutually identical construction, to the deflection mass carrier 12. Each of the coupling formations 22 comprises, at an opening 24 respectively formed in the carrier disks 14 and 16 of the deflection mass carrier 12, a guide track 26 with a radially externally situated guide track apex 28. In association with each such pair of guide tracks 26 in the deflection mass carrier 12, each coupling formation 22 in each of the deflection masses 20 comprises a guide track 30 which is formed in an opening 29 provided in said coupling formation 22 and which has a radially internally situated guide track apex 32. Furthermore, each coupling formation 22 comprises a coupling element 34 which is of roller-like or cylinder-like form and which extends both through the openings 24 formed in the carrier disks 14, 16 and through the associated opening 29 formed in a respective deflection mass 20 and which thus interacts with each of the guide tracks 26, 30.

By the coupling formations 22 provided pairwise in association with each deflection mass 20, a relative movement of the deflection masses 20 with respect to the deflection mass carrier 12 is made possible. During rotational operation, that is to say during rotation of the deflection mass carrier 12 about an axis of rotation A, the deflection masses 22 are basically pulled radially outward owing to the centrifugal force acting thereon. This has the effect that the coupling elements 34 are forced, by the guide tracks 26, on the one hand, and guide tracks 30, on the other hand, which are acted on radially with respect to one another, into the respective guide track apex 28, 32. In the case of the basic relative positioning, illustrated in FIG. 1, of the deflection masses 20 with respect to the deflection mass carrier 12, when the coupling elements 34 are positioned in the region of the respective guide track apex 28, 32, the deflection masses 20 assume their positioning in which they are displaced radially outward to a maximum extent with respect to the deflection mass carrier 12.

If rotational non-uniformities arise during rotational operation, this leads to a circumferential acceleration of the deflection mass carrier 12. Since the deflection masses 20 will initially not be able to follow, or will initially not follow, this circumferential acceleration, they are moved in a circumferential direction with respect to the deflection mass carrier 12. During this movement, the coupling elements 34 roll along the guide tracks 26, 30, which, owing to the curved configuration of the guide tracks 26, 30, has the effect that, during movement proceeding from the basic relative position, the deflection masses 20 not only move in the circumferential direction with respect to the deflection mass carrier 12 but are also forced radially inward. Here, the deflection masses 20 absorb potential energy and are thus stimulated to perform a vibration, which counteracts the acceleration or vibration acting on the deflection mass carrier 12.

In the case of the configuration of the coupling formations 22 illustrated in FIG. 1, the deflection masses 20 perform such a movement with respect to the deflection mass carrier 12 that a center of mass M of the deflection masses 20 performs both a translational movement radially inward, or parallel to a radial line, and a translational movement oriented orthogonally with respect to such a radial line, that is to say tangentially. A pivoting of the deflection masses 20 for example about a pivot axis which extends through the center of mass M and parallel to the axis of rotation A substantially does not occur.

On the deflection mass carrier 12, there is provided a stop formation which is denoted generally by 36. Said stop formation 36 comprises a stop carrier 38, which is constructed in rigid form, for example from metal material, and elastic stop material 40, which is for example molded onto the outer circumferential region thereof and/or held thereon by positive locking. For example, the stop carrier 38 may be constructed with sintered steel material, and the stop material 40 may be constructed with elastomer material, such as for example AEM, FKM, HNBR or EPDM, preferably, in one exemplary arrangement, with a hardness of approximately 90 Shore A. The stop formation 36 provides, in association with each deflection mass 20, a stop region 42 with which, as described in detail below, a respective deflection mass 20 can come into contact during deflection out of the basic relative position. It can be seen in FIG. 1 that, in the illustrated embodiment, the deflection masses 20 are, in their radially inner region 44 which comes into contact with the stop formation 36, formed with a substantially rectilinear and also substantially tangentially extending contour, with the stop regions 42 of the stop formation 36 also having, in a manner adapted to this, a rectilinearly extending contour which is arranged tangentially with respect to a radial line, that is to say substantially orthogonally with respect thereto. It can also be seen in FIG. 1 that, in the basic relative position, that is to say in the case of a center of mass M that has been displaced radially outward to a maximum extent, the radially inner regions 44 of the deflection masses 20 have a spacing D to the respectively associated stop regions 42 of the stop formation 36.

The movement of a respective deflection mass 20 in the event of rotational non-uniformities, that is to say circumferential accelerations, will be discussed below with reference to FIGS. 1, 2 and 3.

FIG. 1 illustrates the deflection mass 20 in the basic relative position with respect to the deflection mass carrier 12. The radially inner region 44 of the illustrated deflection mass 20 has the spacing D to the stop region 42 of the stop formation 36. The guide tracks 26, 30 which are provided both in the deflection mass carrier 12 and in the deflection mass 20, of which, in FIG. 2, it is possible to see the guide track 26 of the carrier disk 16 and the guide track 30 of the deflection mass 20 in association with the coupling formation 22, are configured such that, proceeding from the basic relative position, they allow an equal maximum deflection $A_M$ in both circumferential directions. For example, in the illustrated exemplary arrangement, when the maximum deflection $A_M$ is reached, a further movement of the respective coupling element 34 in the openings 24, 29, which receive said coupling element 34, in the carrier disks 14, 16 and in the deflection mass 20 respectively would not be possible.

With regard to the maximum deflection $A_M$ illustrated in FIG. 1, it is pointed out that this is expressed as a deflection angle $W_1$ of, for example, 50° of an approximately circular, that is to say curved movement path, which is passed through by the center of mass M of the deflection mass 20 during deflection thereof, proceeding from a basic positioning of the center of mass M illustrated in FIG. 1 in the case of a deflection mass 20 positioned in the basic relative position. Said movement path of the center of mass M can be regarded, at least in the region close to the basic positioning, approximately as a circular path about a central point, which is to be regarded as a center of mass movement center Z, of a circle which describes such a circular path. For the tuning of such a rotary vibration damping assembly 10 to a particular stimulating order, for example to the ignition frequency of an internal combustion engine, the guide tracks may, with increasing spacing to the respective guide track apexes 28, 32, have a contour which deviates from a circular shape in the sense of a decrease of the track curvature radius, such that such a configuration of the guide tracks 26, 30, and consequently also the movement path of the center of mass M, can also be regarded approximately as an elliptical path, in the case of which a respective apex, or the basic positioning, can be assumed in the region of the least curvature of the respective path.

Assuming an approximately circular movement of the center of mass M, for a path radius $r_B$, the following relationships can apply approximately for a movement path B of the center of mass in relation to the radial spacing $r_{SP}$ of the center of mass M to the axis of rotation A, for example in the case of a deflection mass 20 being positioned in the basic relative position:

$$r_B = r_{SP}/(1+ORD^2),$$

where ORD is a vibration order of a stimulating system in relation to which tuning is to be performed.

In the case of deflection of the deflection mass 20 and corresponding movement of the coupling elements 34 along the guide tracks 26, 30, in the context of the above-described superposed translational movements, the deflection mass 20 moves increasingly radially inward and thus, with its radially inner region 44, approaches the associated stop region 42. When a stop deflection $A_A$ is reached, which corresponds to a deflection angle $W_2$ of for example 42° of the center of mass M, as illustrated in FIGS. 2 and 3, the radially inner region 44 comes into contact with the stop region 42. Since these two regions are formed with rectilinearly extending contours running parallel to one another, and since the deflection mass 20 is displaced in translation without intrinsic rotation, the radially inner region 44 of the deflection mass 20 and the stop region 42 come into elongate areal abutting contact with one another in a length region $L_A$, such that the pressure exerted on the elastic stop material 40 by the deflection mass 20 is distributed substantially uniformly. With increasing compression of the stop material 40 and thus slightly continued displacement of the deflection mass 20, length regions $L_Z$ of the stop material 40 which adjoin the length region $L_A$ are also deformed and thus take effect.

Owing to the configuration of the stop material 40 with elastomer material and thus with an elastic characteristic, this can, when subjected to load by the deflection mass 20, deflect radially inward and, in the process, absorb and/or dissipate energy. The deflection mass 20 thus does not experience a hard impact, but its movement is absorbed softly. This prevents both damage and the generation of impact noises in the region of the rotary vibration damping assembly 10.

In order, in the case of the configuration of the deflection masses 20 implemented with multiple disks 21, 23, to prevent damage to the stop material 40 in the adjacent region of the disks 21, 23 at the radially inner region 44, in particular if the disks 21, 23 are not fixedly connected to one another, it is possible, as can be seen in FIG. 3, for stop material 40 to be constructed with two parts 46, 48, which, in particular in the region in which they come into contact with a respective deflection mass 20, have a spacing to one another such that the adjacent region of the two disks 21, 23 will not come into contact with the stop material 40, and accordingly also cannot cause damage to the stop material 40. By the intermediate space formed between the two parts 46, 48, it is at the same time also the case that a yielding volume is provided into which the generally incompressible but deformable stop material 40 can yield. If the two disks 21, 23 are fixedly connected to one another, or if a deflection mass 20 is constructed only from a single disk, the stop material 40 may also be constructed in one piece, that is to say as one material block. In the case of such a configuration, a yielding volume for the stop material 40 may be provided for example in the carrier disks 14, 16 or at the radially inner region 44 of the deflection mass 20.

In the case of the stop material 40 provided in association with each of the deflection masses 20 being dimensioned in order to ensure that, even in the case of the maximum expected relative accelerations between the deflection mass carrier 12 and the deflection masses, the stop material 40 can still act in the range of its elastic deformability, one input variable that must be taken into consideration is the momentum of the deflection mass that exists at the moment of impact of a deflection mass against the associated stop material 40. This momentum is expressed by the following relationship:

$$P = M_{eff} \times \Delta s / \Delta t.$$

For the present disclosure, in this momentum, the term $$M_{eff} \times \Delta s$$

is taken into consideration as an impact variable E which stands for the state of motion, or kinetic energy that exists at the moment of impact, of a respective stop mass 20.

In this term, or in this impact variable, $M_{eff}$ represents the effective mass, discussed in more detail below, of a respective deflection mass, and the variable $\Delta s$ is, for the case of a maximum possible movement of the deflection mass 20, assumed to be twice the stop deflection $A_a$. The following relationship is thus obtained for the impact variable E:

$$E = M_{eff} \times 2 \times A_a.$$

In the case that a deflection mass 20 moves in an air-filled volume, the effective mass $M_{eff}$ can be equated to the mass of the deflection mass 20. If the deflection mass moves for example in an oil-filled volume, for example in a hydrodynamic torque converter, the effective mass of the deflection mass 20 can be determined as:

$$M_{eff} = (\rho_A - \rho_U) \times V_A$$

Here, $\rho_A$ is the density of the construction material of the deflection mass, that is to say for example the density of steel material, and $\rho_U$ is the density of the medium surrounding the deflection mass 20, that is to say for example the density of oil. $V_A$ is the volume of a respective deflection mass 20.

For the case that the movement path B of the center of mass M approximately corresponds to a circular path, the stop deflection $A_a$ can be determined on the basis of the following relationship:

$$A_A = 2 \times r_B \times \pi \times W_2 / 360°.$$

In this relationship, the path radius $r_B$ can be determined in accordance with the relationship, stated above, between the radial spacing $r_{SP}$ of the center of mass M to the axis of rotation A and the stimulation order.

The following is thus obtained for the impact variable E:

$$E = M_{eff} \times 2 \times 2 \times r_B \times \pi \times W_2 / 360.$$

This impact variable can, for the assumption of an approximately circular movement of the center of mass M, be used as a variable which represents the kinetic energy of the stop mass 20 that exists at the time of the occurrence of contact between a stop mass 20 and the associated stop material 40. It is pointed out that, for the case that the movement path B in fact deviates from an exact circular path, it is very clearly possible for a value for the stop deflection $A_A$ that takes into consideration the exact path profile to be used in the above-stated relationship for the stop deflection $A_A$.

The volume of the stop material 20 that is effective for the impact damping may be determined for example by the product of the length of the length region $L_A$ by the cross-sectional area of the stop material, wherein it can for example be assumed that, in the length region $L_A$, the stop material may have an approximately constant cross-sectional area. Alternatively, it is additionally also possible for the volumes provided by the adjacent length regions $L_Z$ and the corresponding cross-sectional areas of the stop material 40 to be taken into consideration, wherein increased design safety is attained if said volumes are not taken into consideration.

According to the principles of the disclosure, this volume $V_E$ of the stop material which is effective as a result of elastic deformation upon the impacting of a deflection mass 20 is set in relation to the impact variable E, resulting in the following relationship:

$$R = V_E/E.$$

It has been found that, if the following applies for this ratio R:

$$0.15 \times 10^{-3} \text{ m}^2/\text{kg} \leq R \leq 0.6 \times 10^{-3} \text{ m}^2/\text{kg},$$

a sufficient volume of the stop material 40 is provided in association with a respective deflection mass 20, which ensures that the maximum kinetic energy of the stop material expected upon the impacting of the deflection mass 20 against the stop material 40 can be fully absorbed by deformation of the stop material 40 in the region that is then acted on by the deflection mass 20.

This thus means that the stop material 40 must be provided in association with a respective deflection mass 20 in such a volume, which is for example distributed uniformly over the length region $L_A$, and possibly additionally also the length regions $L_Z$, that, taking into consideration the construction parameters reflected in the impact variable E, the ratio R lies in the stated value range. The parameters reflected in the impact variable E, such as for example the effective mass of a respective deflection mass and the length of the movement path between the basic relative position of a respective deflection mass and the stop deflection, are known, or can be determined during the configuration of a rotary vibration damping assembly, and then used for determining the impact variable E.

A calculation example for such a configuration is given below. It is assumed, by way of example, that the mass of a deflection mass is 0.288 kg. The spacing of the center of mass M to the axis of rotation A is 0.1063 m. The cross-sectional area of the stop material 40 is $22.4 \times 10^{-6}$ m$^2$ and the length of the length region $L_A$ is $75 \times 10^{-3}$ m. This thus yields a volume $V_E$ of the stop material 40 of $1.7 \times 10^{-6}$ m$^3$. In particular if the second vibration order of a stimulating vibration is to be dampened, a resulting value for the impact variable E is $8.977 \times 10^{-3}$ kgm, under the assumption that a deflection mass 40 moves in air. Taking this into consideration, a resulting value for the ratio R is $0.189 \times 10^{-3}$ m$^2$/kg. If the length regions $L_Z$ are also taken into consideration in the determination of the volume $V_E$, this results in a value $V_E = 1.91 \times 10^{-6}$ m$^3$. This leads to a ratio R of $0.213 \times 10^{-3}$ m$^2$/kg.

The above-stated example thus shows that, with a structural configuration that ensures sufficient impact damping for the deflection masses, the value R lies in the value range defined above.

The construction of a drive system in which a rotary vibration damping assembly 10 with the above-described configuration can be used will be described below with reference to FIG. 4.

Figure 4:
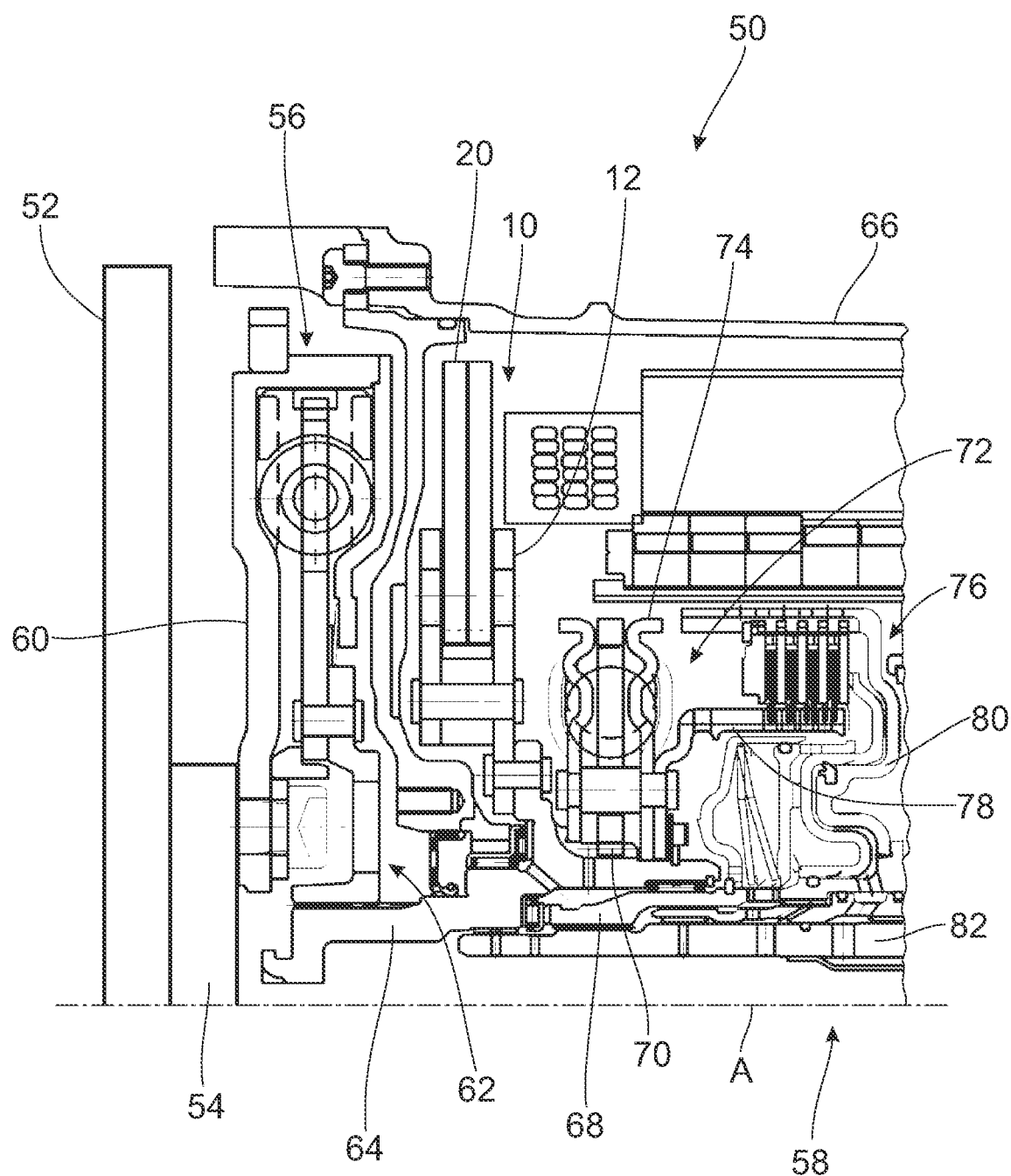
FIG. 4 shows a drive system with a rotary vibration damping assembly integrated into a transmission.

FIG. 4 shows a drive system 50 for a vehicle, in which drive system a schematically illustrated internal combustion engine 52, or the crankshaft 54 thereof, is coupled by a torsional vibration damper 56, for example dual-mass flywheel, to a drivetrain 58. Whereas a primary side 60 of the torsional vibration damper 56 is connected to the crankshaft 54, a secondary side 62 of the torsional vibration damper 50 is coupled by a hub 64, which extends out of a transmission 66, to the deflection mass carrier 12 of a rotary vibration damping assembly 10 and to the primary side 70 of a further torsional vibration damper 72. A secondary side 74 of the further torsional vibration damper 72 is connected to an inner plate carrier 78 which provides an input region of a multiplate clutch 76. An outer plate carrier 80, which provides an output region of the multiplate clutch 76, is connected by a further hub 68 to a transmission input shaft 82 of the transmission 66.

The rotary vibration damping assembly 10, which is coupled by the deflection mass carrier 12 to the hub 64, has the above-described construction and can thus contribute efficiently to the damping of rotary vibrations stimulated in the internal combustion engine 12, wherein a configuration for a particular order of said stimulating vibrations can be provided. Here, the interior space of the transmission 66 may be at least partially filled with oil such that, as discussed above, at least some of the deflection masses move in the oil as the medium surrounding the deflection masses 20, and thus the effective density of the deflection masses 20 is reduced.

The invention claimed is:

1. A rotary vibration damping assembly comprising a deflection mass carrier, which is rotatable about an axis of rotation, and a multiplicity of deflection masses which are mounted, following one another in a circumferential direction, on the deflection mass carrier so as to be deflectable out of a basic relative position with respect thereto, wherein, during deflection out of the basic relative position, a radial position of the deflection masses with respect to the axis of rotation changes, wherein the deflection masses are mounted by coupling formations on the deflection mass carrier so as to be deflectable in both circumferential directions proceeding from the basic relative position, wherein, in association with at least one deflection mass, there is provided an elastically deformable stop formation for ending a deflection movement of the deflection mass after a stop deflection is reached, wherein the elastically deformable stop formation comprises elastic stop material which is mounted fixedly with respect to the deflection mass carrier, wherein, in association with at least one deflection mass, the ratio R applies:

$$R = V_E/E$$

where $V_E$ is a stop material volume which, in association with the deflection mass, is effective when the stop deflection is reached as a result of deformation of the elastic stop material, and E is an impact variable related to kinetic energy of the deflection mass when the stop deflection is reached, and wherein the following applies for the ratio R:

$$0.15 \times 10^{-3} \text{ m}^2/\text{kg} \leq R \leq 0.6 \times 10^{-3} \text{ m}^2/\text{kg}.$$

2. The rotary vibration damping assembly as claimed in claim 1, wherein the following applies for the impact variable E:

$$E = M_{eff} \times 2 \times A_A$$

where $M_{eff}$ is an effective mass of a deflection mass and $A_A$ is the stop deflection of the deflection mass, with respect to the basic relative position of the deflection mass, in the event of contact between the deflection mass and the stop material.

3. The rotary vibration damping assembly as claimed in claim 2, wherein the effective mass of a deflection mass (20) is the mass of the deflection mass.

4. The rotary vibration damping assembly as claimed in claim 2, wherein the following applies for the effective mass of a deflection mass:

$$M_{eff}=(\rho_A-\rho_U)\times V_A$$

where $\rho_A$ is a density of a construction material of the deflection mass, $\rho_U$ is a density of a medium surrounding the deflection mass, and $V_A$ is a volume of the deflection mass.

5. The rotary vibration damping assembly as claimed in claim 1, wherein the following applies for the stop deflection:

$$A_A=2\times r_B\times \pi\times W_2/360°$$

where $r_B$ is a path radius of a movement path of a center of mass of the deflection mass about a center of mass movement center, and $W_2$ is a deflection angle of the center of mass during movement of the deflection mass between the basic relative position of the deflection mass with respect to the deflection mass carrier and the relative position of the deflection mass with respect to the deflection mass carrier that exists in the event of contact between the deflection mass and the stop material.

6. The rotary vibration damping assembly as claimed in claim 1, wherein each coupling formation comprises at least one guide track with radially externally situated guide track apex in the deflection mass carrier, at least one guide track with radially internally situated guide track apex in one of the deflection masses, and a roller-like coupling element which is movable along the at least one guide track in the deflection mass carrier and the at least one guide track in the deflection mass, wherein, when the deflection mass is positioned in the basic relative position, the coupling element is positioned at the guide track apex of the at least one guide track in the deflection mass carrier and at the guide track apex of the at least one guide track in the deflection mass.

7. The rotary vibration damping assembly as claimed in claim 1, wherein each deflection mass is coupled by the coupling formations associated therewith to the deflection mass carrier such that, during deflection out of the basic relative position, a deflection movement of the deflection mass is made up of a translational radial movement in a direction parallel to a radial direction with respect to the axis of rotation and a translational tangential movement in a direction orthogonal to a radial direction with respect to the axis of rotation.

8. The rotary vibration damping assembly as claimed in claim 1, wherein the stop material is constructed with elastomer material.

9. A drive system for a vehicle, comprising an internal combustion engine and a drivetrain which interacts in terms of drive with the internal combustion engine and which has at least one rotary vibration damping assembly as claimed in claim 1.

10. The rotary vibration damping assembly as claimed in claim 8, wherein the elastomer material is one of AEM, FKM, HNBR or EPDM.

11. The rotary vibration damping assembly as claimed in claim 8, wherein the stop material has a Shore A hardness in the range from 0.85-0.95.

12. The rotary vibration damping assembly as claimed in claim 11, wherein the stop material has a Shore A hardness of approximately 0.9.

13. The rotary vibration damping assembly as claimed in claim 1, wherein each of the coupling formations comprises at an opening formed in the carrier disks of the deflection mass carrier, a guide track with a radially externally situated guide track apex.

14. The rotary vibration damping assembly as claimed in claim 13, wherein each of the deflection masses comprises a guide track which is formed in an opening provided in the coupling formation and which has a radially internally situated guide track apex.

15. The rotary vibration damping assembly as claimed in claim 14, wherein each coupling formation comprises a coupling element which is roller-like and which extends through the openings formed in the carrier disks and through the opening formed in a deflection mass.

\* \* \* \* \*